United States Patent [19]
Johnson

[11] Patent Number: 5,402,021
[45] Date of Patent: Mar. 28, 1995

[54] MAGNETIC PROPULSION SYSTEM

[76] Inventor: Howard R. Johnson, 1440 Harding Rd., Blacksburg, Va. 24060

[21] Appl. No.: 64,930

[22] Filed: May 24, 1993

[51] Int. Cl.⁶ ..................... B65G 35/06; H02K 41/00
[52] U.S. Cl. ..................................... 310/12; 310/152; 198/619
[58] Field of Search ............................ 310/12, 152, 46; 198/619, 805

[56] References Cited

U.S. PATENT DOCUMENTS

| | | | |
|---|---|---|---|
| 4,151,431 | 8/1979 | Johnson | 310/12 |
| 4,215,330 | 6/1980 | Hartman | 335/306 |
| 4,877,983 | 10/1989 | Johnson | 310/12 |

OTHER PUBLICATIONS

Advances in Permanent Magnetism, pp. 44–57 date unknown.
Scientific American, Jan. 1989, pp. 90–97.
Introduction to Magnetic Materials, pp. 129–135 date unknown.
Applications of Magnetism, pp. 42–47 date unknown.

*Primary Examiner*—Steven L. Stephan
*Assistant Examiner*—Judson H. Jones
*Attorney, Agent, or Firm*—Beaman & Beaman

[57] ABSTRACT

A magnetic propulsion system including a plurality of specifically arranged permanent magnets and a magnetic vehicle propelled thereby along a path defined by the permanent magnets. The magnetic vehicle which is to be propelled includes a rigidly attached armature comprising several curved magnets. The propulsion system further includes two parallel walls of permanent magnets arranged so as to define the lateral sides of a vehicle path. Preferably, the walls are identical to one another except that the polarities of the magnets which define one wall are opposite from the polarities of the corresponding magnets in the opposite wall. A first wall, for example, includes a series of generally rectangular magnets, each magnet arranged with a North-to-South axis pointing longitudinally down the wall in the intended direction of vehicle travel. Each of the rectangular magnets is separated from the next successive rectangular magnet by a thinner magnet, which thinner magnet is arranged with its North-to-South axis pointing laterally toward the opposite wall and therefore perpendicular with respect to the North-to-South axis of the rectangular magnets. The opposite (or second) wall includes the same general arrangement of magnets, except that the North-to-South axis for each of the generally rectangular magnets is in a direction opposite from the direction of vehicle travel and the North-to-South axis of the thinner magnets points away from the first wall. In addition, the propulsion system includes several spin accelerators.

19 Claims, 1 Drawing Sheet

MAGNETIC PROPULSION SYSTEM

FIELD OF THE INVENTION

The present invention relates to a magnetic propulsion system including a plurality of specifically arranged permanent magnets and a magnetic vehicle propelled thereby along a path defined by the permanent magnets.

BACKGROUND OF THE INVENTION

The generation of unidirectional propelling forces by permanent magnets is already known and recognized in U.S. Pat. Nos. 4,151,431 and 4,877,983 to Johnson, and U.S. Pat. No. 4,215,330 to Hartmen, by way of example. According to applicant's first patent (U.S. Pat. No. 4,151,431), such forces are generated by magnetic interaction between a curved magnet bar of an armature guided for movement along a circular path and an arrangement of spaced stator magnets having pole faces of one polarity facing the armature on one side thereof parallel to the path of movement.

According to applicant's second patent (U.S. Pat. No. 4,877,983), the armature magnet is mounted on a vehicle and guided along a path through a magnetic flux zone limited on opposite sides of the path by an arrangement of magnetic pole surfaces of one polarity on stator magnets. According to one embodiment of the second patent, the flux zone is formed by spaced gate assemblies of magnets having exposed pole faces of one polarity in a plane perpendicular to the armature path from which a magnetic field extends to the opposite pole faces and a ring magnet fixed to such opposite pole faces of the other polarity, with a radially inner pole surface of the same polarity producing a magnetic field perpendicular to the first mentioned field to their opposite radially outer pole surfaces. Several other embodiments are illustrated including variations in the armature structure and in the stator structure; however, all of the embodiments teach use of an annular stator assembly.

SUMMARY OF THE INVENTION

It is therefore an object of the present invention to provide an improved magnetic propulsion system having a plurality of permanent magnets and a magnetic vehicle propelled thereby along a path defined by the permanent magnets, wherein the permanent magnets need not encircle the path of the magnetic vehicle.

In order to achieve this and other objects, the present invention comprises two parallel walls of permanent magnets arranged so as to define the lateral sides of a vehicle path. The walls are identical to one another except that the polarities of the magnets which define one wall are opposite from the polarities of the corresponding magnets in the opposite wall.

A first wall, for example, includes a series of generally rectangular magnets, each magnet arranged with a North-to-South axis pointing longitudinally down the wall in the intended direction of vehicle travel. Each of the rectangular magnets is separated from the next successive rectangular magnet by a thinner magnet, which thinner magnet is arranged with its North-to-South axis pointing laterally toward the opposite wall and therefore perpendicular with respect to the North-to-South axis of the rectangular magnets.

The pole-to-pole length of each thinner magnet is preferably no more than half the width of the generally rectangular magnets. Accordingly, a gap on the inside surface of the wall is defined by the presence of each thinner magnet.

The opposite (or second) wall includes the same general arrangement of magnets, except that the North-to-South axis for each of the generally rectangular magnets is in a direction opposite from the direction of vehicle travel and the North-to-South axis of the thinner magnets points away from the first wall.

In addition, the propulsion system of the present invention includes several spin accelerators for crowding the magnetic fields at predetermined positions along the length of the walls. This crowding of the magnetic fields serves to intensify the fields and causes the vehicle's armature to be accelerated faster than would otherwise be the case without the spin accelerators.

The spin accelerators project laterally outward from each of the walls at predetermined positions along the longitudinal length of each wall. Each spin accelerator comprises a generally rectangular permanent magnet which is preferably identical to that of the first and second walls. Each spin accelerator further includes a shorter magnet having a smaller pole-to-pole length than that of the generally rectangular magnet and a wedge separating the generally rectangular magnet of the spin accelerator from the shorter magnet.

The orientation of the generally rectangular magnet in the spin accelerator is determined by which pole of the wall's thinner magnet is facing outwardly. The rectangular magnet's orientation is such that face-to-face contact is established between opposite poles of the generally rectangular magnet in the spin accelerator and the thinner magnet in the wall. Accordingly, the North-to-South axis of the generally rectangular magnet in the spin accelerator points in the same direction as the North-to-South axis of the thinner magnet in the wall. The shorter magnet in the spin accelerator is likewise arranged with its North-to-South axis pointing in the same general direction as that of the thinner magnet in the wall; but here, an acute angular tilt away from the North-to-South axis of the thinner magnet is established by the wedge. In particular, the angle of the wedge determines the acute angle which exists between the North-to-South axis of the shorter magnet in the spin accelerator and the North-to-South axis of the thinner magnet in the wall.

The magnetic vehicle which is to be propelled by the instant propulsion system includes a rigidly attached armature comprising several curved magnets. Each curved magnet is arranged on the vehicle such that its North-to-South axis is parallel with respect to that of the other curved magnets. In particular, the North-to-South axes of all the curved magnets point in the same direction as the North-to-South axes of the thinner magnets in each wall. The vehicle itself is preferably a wheeled vehicle mounted on a track; however, it is understood that other vehicle structures will suffice so long as the vehicle is maintained between the walls of the propulsion system.

In operation, the magnetic fields created by the two walls exert a propelling force on the armature of the vehicle in the desired direction of travel. Since the armature of the vehicle is rigidly attached to the vehicle, the vehicle itself begins to accelerate and is hence set in motion by the propulsion system.

Preferably, the curved magnets of the vehicle armature are "Alnico 8" magnets tipped with neodymium magnets. The magnets which constitute the walls and spin accelerators are preferably made of neodymium and ceramic material, except for the thinner magnets. The thinner magnets are preferably made of rubber or plastic, and each can comprise a plurality of magnetic rubber or plastic layers.

Although the present invention has been described with regard to generally rectangular magnets, it is understood that other permanent magnet shapes will suffice, including but not limited to generally cylindrical shapes.

DETAILED DESCRIPTION OF A PREFERRED EMBODIMENT

Figure 1:
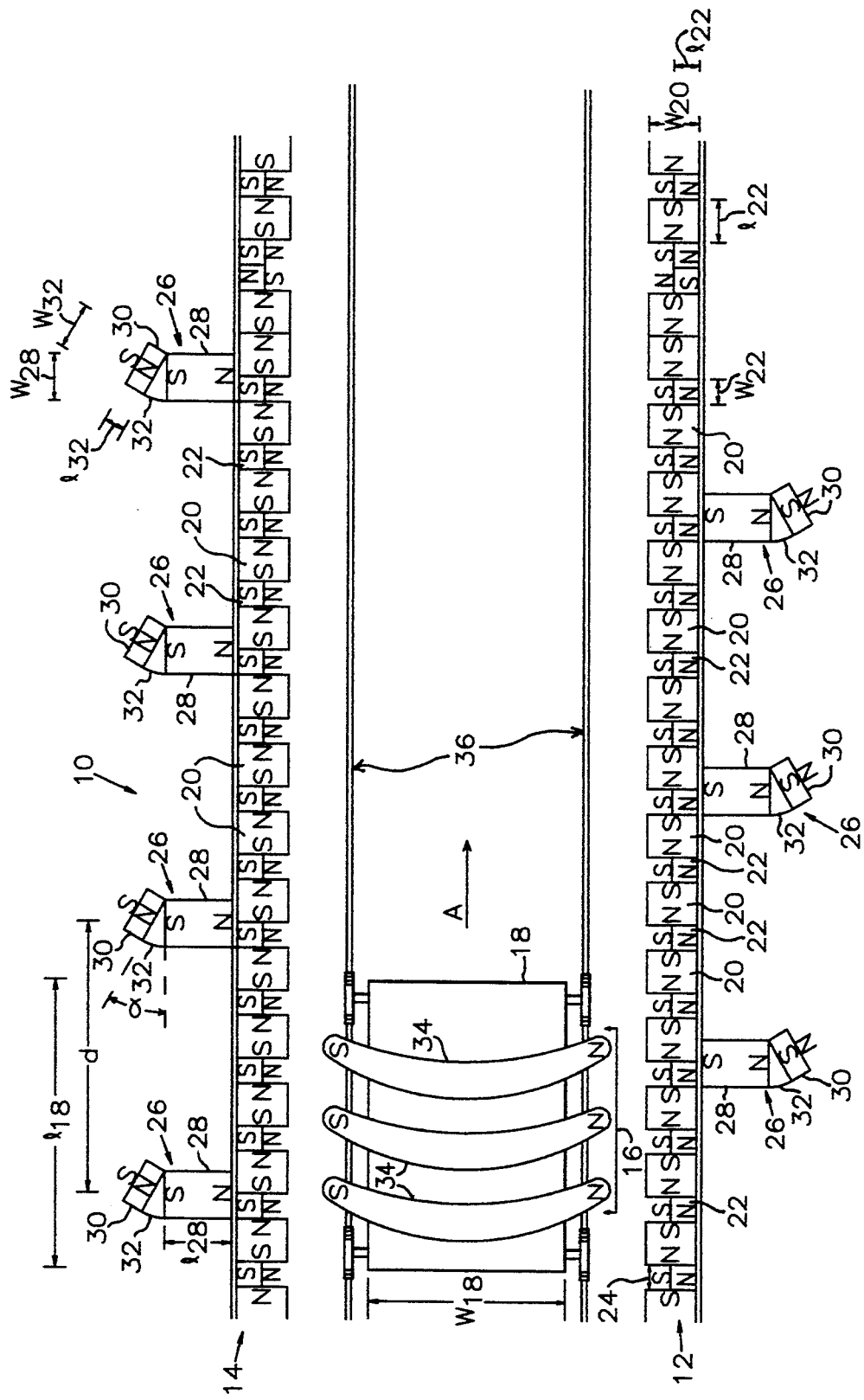
FIG. 1 is a schematic plan view of a magnetic propulsion system in accordance with a preferred embodiment of the present invention.

With reference to FIG. 1, a preferred embodiment of the inventive magnetic propulsion system and vehicle propelled thereby will now be described.

FIG. 1 schematically illustrates a propulsion system 10 comprising two parallel magnetic walls 12,14 which are stationary, and an armature 16 rigidly attached to a vehicle 18. The two parallel walls 12,14 are formed from several permanent magnets arranged so as to define the lateral sides of a vehicle path. The desired direction of vehicle travel is indicated by an arrow A in FIG. 1. The two walls 12,14 are identical to one another except that the polarities of the magnets which define one wall 12 are opposite from the polarities of the corresponding magnets in the opposite wall 14. A first wall 12, for example, includes a series of generally rectangular magnets 20, each magnet arranged with a North-to-South axis pointing longitudinally down the wall in the intended direction of vehicle travel (indicated by arrow A). Each of the magnets 20 preferably comprises a ceramic magnet with a neodymium north pole. In addition, each of the generally rectangular magnets 20 is separated from the next successive rectangular magnet 20 by a thinner magnet 22. The thinner magnets 22 are arranged with their North-to-South axes pointing laterally toward the opposite wall 14 and therefore perpendicular with respect to the North-to-South axis of the rectangular magnets 20. Each thinner magnet 22 is preferably made from rubber or plastic permanently magnetic material. Also, the pole-to-pole length of each thinner magnet 22 is preferably no more than half the width of the generally rectangular magnets 20. Consequently, a gap 24 on the inside surface of the wall 12 is defined by the presence of each thinner magnet 22.

The opposite (or second) wall 14 includes the same general arrangement of magnets 20,22, except that the North-to-South axis for each of the generally rectangular magnets 20 points in a direction opposite from the direction of vehicle travel, while the North-to-South axes of the thinner magnets 22 point away from the first wall 12.

By arranging the thinner magnets 22 between the generally rectangular magnets 20 in the foregoing manner, there is a pole shading effect on the magnets 20 of the walls 12,14.

In addition, the propulsion system 10 of the preferred embodiment includes several spin accelerators 26 for crowding the magnetic fields at predetermined positions along the length of the walls 12,14. This crowding of the magnetic fields serves to intensify the fields and causes the vehicle's armature to be accelerated faster than would otherwise be the case without the spin accelerators.

The spin accelerators 26 project laterally outward from each of the walls 12,14 at predetermined positions along the longitudinal length of each wall 12,14. According to the preferred embodiment, the spin accelerators 26 are positioned along the walls 12,14 at every other thinner magnet 22 (as is shown in the middle of FIG. 1). Each spin accelerator 26 comprises a generally rectangular permanent magnet 28 which is preferably identical or very similar to that of the first and second walls 12,14. Each spin accelerator 26 further includes a shorter magnet 30 having a smaller pole-to-pole length than that of the generally rectangular magnet 28 and a wedge 32 separating the generally rectangular magnet 28 of the spin accelerator 26 from the shorter magnet 30. The orientation of the generally rectangular magnet 28 in the spin accelerator 26 is determined by which pole of the wall's thinner magnet 22 is facing outwardly. The rectangular magnet's orientation is such that face-to-face contact is established between opposite poles of the generally rectangular magnet 28 in the spin accelerator 26 and the thinner magnet 22 in the wall 12,14. Accordingly, the North-to-South axis of the generally rectangular magnet 28 in the spin accelerator 26 points in the same direction as the North-to-South axis of the thinner magnet 22 in the wall 12,14. The shorter magnet 30 in the spin accelerator 26 is likewise arranged with its North-to-South axis pointing in the same general direction as that of the thinner magnet 22 in the wall 12,14; but here, an acute angular tilt away from the North-to-South axis of the thinner magnet 22 is established by the wedge 32. In particular, the angle α of the wedge determines the acute angle which exists between the North-to-South axis of the shorter magnet 30 and the North-to-South axis of the thinner magnet 22 in the wall 12,14. The shorter magnet 30 preferably consists of neodymium.

The magnetic vehicle 18 which is to be propelled by the instant propulsion system 10 includes a rigidly attached armature 16 comprising several curved magnets 34. Each curved magnet 34 is arranged on the vehicle 18 such that its North-to-South axis is parallel with respect to that of the other curved magnets 34. In particular, the North-to-South axes of all the curved magnets 34 point in the same direction as the North-to-South axes of the thinner magnets 22 in each wall 12,14. The vehicle 18 itself, according to the preferred embodiment, is a wheeled vehicle mounted on a track 36. It is understood, however, that other vehicle structures will suffice so long as the vehicle is maintained between the walls 12,14 of the propulsion system 10.

In operation, when the vehicle 18 is positioned as is shown in FIG. 1, the magnetic fields created by the two walls 12,14 exert a propelling force on the armature 16 of the vehicle 18 in the desired direction of travel (arrow A). Since the armature 16 is rigidly attached to the vehicle 18, the vehicle 18 itself begins to accelerate and hence is set in motion by the propulsion system 10.

Furthermore, since the spin accelerators 26 serve to crowd and thereby intensify the magnetic fields at predetermined positions along the walls 12,14, the acceleration of the vehicle is enhanced as the vehicle passes these predetermined positions.

The spin accelerators 26 can be reversed in order to lessen their effectiveness at crowding the magnetic fields. Reversing of the spin accelerators 26 can be accomplished by rotating the spin accelerators 26 so that the shorter magnets 30 tilt away from the intended direction of vehicle travel, rather than in the direction of travel as is the case for the illustrated embodiment.

Preferably, the curved magnets 34 of the vehicle armature 16 are "Alnico 8" magnets tipped with neodymium magnets, while the wedges 32 comprise wood or similar material and an angle $\alpha$ of 45 to 90 degrees.

The width $w_{20}$, height, and pole-to-pole length $l_{20}$ of the generally rectangular magnets 20 in each wall 12,13 are 0.75 inches to 1.25 inches, 3.75 to 4.25 inches, and 1.25 inches to 1.75 inches, respectively. The width $w_{22}$, height, and pole-to-pole length $l_{22}$ of the thinner magnets 22 in the walls 12,14 are 1 inch to 1.5 inches, 3.75 inches to 4.25 inches, and no more than one half the width $w_{20}$ of the generally rectangular magnets, respectively. In the spin accelerators 26, the width $w_{28}$, height, and pole-to-pole length $l_{28}$ of the generally rectangular magnets 28 are 1.125 to 1.625 inches, 3.75 to 4.25 inches, and 0.875 inches to 1.375 inches, respectively, while the width $w_{32}$, height, and pole-to-pole length $l_{32}$ of the shorter magnets 30 are 0.75 inch to 1.25 inches, 3.75 inches to 4.25 inches, and 0.125 inch to 0.375 inch, respectively.

Preferably, the distance separating the walls 12,14, is such that each wall 12,14 is 0.5 inch to 1.25 inches away from the tips of the armature magnets 34, both walls 12,14 being equidistant from the tips of the armature 16. Also, the curved magnets 34 of the armature 16 are preferably 0.375 inch to 0.625 inch apart from one another.

Testing of the foregoing prototype propulsion system resulted in the vehicle moving 2 feet in one second.

Although the present invention has been described with reference to a preferred embodiment, it is understood that various modifications to this embodiment will become subsequently apparent to those having ordinary skill in the art. In this regard, the scope of the invention is limited only by the claims appended hereto, and not by the illustrated embodiment.

I claim:

1. A magnetic propulsion system comprising:
   a vehicle having a rigidly attached magnetic armature, said magnetic armature including a first series of magnets positioned across said vehicle and extending generally from one lateral side of the vehicle to another lateral side of the vehicle, all of the magnets in said first series of magnets being generally parallel to one another;
   a first magnetic wall disposed laterally adjacent said vehicle and extending longitudinally along a desired direction of vehicle travel, said first magnetic wall comprising a second series of magnets, each of the magnets in said second series having a particular size and a North-to-South axis pointing in the same direction as the desired direction of vehicle travel, each of said permanent magnets of said particular size in said second series being separated from the next successive permanent magnet in said second series by a thinner magnet, each of said thinner magnets having a pole-to-pole length which is shorter than the lateral width of said magnets of a particular size in said second series, said thinner magnets further having a North-to-South axis pointing perpendicular to the North-to-South axis of said magnets of a particular size in said second series and pointing generally toward a vehicle side of the first magnetic wall; and
   a second magnetic wall disposed generally parallel to said first magnetic wall and laterally adjacent to said vehicle but opposite from said first magnetic wall, said second magnetic wall comprising a third series of magnets, each of said magnets in said third series having said particular size and a North-to-South axis pointing in an opposite direction from the desired direction of vehicle travel, each of the permanent magnets in said third series being separated from the next successive permanent magnet of said particular size in said third series by a thinner magnet, each of said thinner magnets in the second magnetic wall having a pole-to-pole length which is shorter than the lateral width of said magnets of a particular size in said third series, said thinner magnets in the second magnetic wall further having a North-to-South axis pointing in the same general direction as the North-to-South axis of the thinner magnets in the first magnetic wall;
   wherein said first and second magnetic walls create magnetic fields which exert propelling forces on said armature and thereby cause the vehicle to accelerate in the desired direction of vehicle travel.

2. The magnetic propulsion system of claim 1, wherein all of the magnets are comprised of permanent magnetic material.

3. The magnetic propulsion system of claim 1, and further comprising a track disposed between the first and second magnetic walls, said vehicle further comprising at least four wheels for engaging and riding on said track.

4. The magnetic propulsion system of claim 1, wherein the pole-to-pole length of said thinner magnets in said first magnetic wall is shorter than half the lateral width of the magnets of said particular size in said first magnetic wall.

5. The magnetic propulsion system of claim 1, wherein the pole-to-pole length of said thinner magnets in said second magnetic wall is shorter than half the lateral width of the magnets of said particular size in said second magnetic wall.

6. The magnetic propulsion system of claim 1, wherein the thinner magnets in both the first and second magnetic walls, are disposed flush with the outer sides of said first and second walls thereby defining a series of gaps on the internal sides of said first and second walls.

7. The magnetic propulsion system of claim 1, wherein said first series of magnets are curved permanent magnets, each having a North-to-South axis pointing in the same direction as that of the thinner magnets in the first and second magnetic walls.

8. The magnetic propulsion system of claim 7, wherein said curved permanent magnets are "Alnico 8" magnets tipped with neodymium magnets.

9. The magnetic propulsion system of claim 1, wherein all the magnets in said second and third series of magnets in said first and second magnetic walls are permanent ceramic magnets with at least one pole made of neodymium.

10. The magnetic propulsion system of clam 1, and further comprising at least one spin accelerator extending laterally out from each of said first and second magnetic walls.

11. The magnetic propulsion system of claim 10, wherein said at least one spin accelerator comprises:
    a permanent magnet of a second particular size arranged in contact with one of said first or second magnetic walls, said permanent magnet of a second particular size having a North-to-South axis pointing in the same direction as that of the thinner magnets in said first and second magnetic walls;

a generally shorter permanent magnet having a pole-to-pole length shorter than that of the permanent magnet of said second particular size, said generally shorter magnet having a North-to-South axis pointing in the same general direction as that of the thinner magnets in said first and second magnetic walls but tilted away from said same general direction by an acute angle; and a wedge separating said permanent magnet of said second particular size from said generally shorter magnet, said wedge defining said acute angle.

12. The magnetic propulsion system of claim 11, wherein said permanent magnet having said second particular size comprises a ceramic magnet having at least one neodymium pole, and said generally shorter permanent magnet is comprised entirely of neodymium.

13. The magnetic propulsion system of claim 11, wherein said wedge comprises wood.

14. The magnetic propulsion system of claim 11, wherein said acute angle is between 45 and 90 degrees.

15. The magnetic propulsion system of claim 11, wherein said spin accelerators are positioned at every other one of said thinner magnets in said first and second magnetic walls.

16. The magnetic propulsion system of claim 1, wherein said thinner magnets in said first and second magnetic walls are comprised of magnetic rubber.

17. The magnetic propulsion system of claim 1, wherein said thinner magnets in said first and second magnetic walls are comprised of magnetic plastic.

18. The magnetic propulsion system of claim 1, wherein said thinner magnets in said first and second magnetic walls are comprised of more than one layer of permanently magnetic material selected from the group consisting of permanently magnetic rubber and permanently magnetic plastic.

19. The magnetic propulsion system of claim 1, wherein the distance separating the armature from the first and second magnetic walls is between 0.5 inch and 1.25 inches.

* * * * *